(12) United States Patent
Turchi et al.

(10) Patent No.: US 7,977,929 B2
(45) Date of Patent: Jul. 12, 2011

(54) METHOD FOR REGULATING A VOLTAGE AND CIRCUIT THEREFOR

(75) Inventors: Joel Turchi, Gagnac sur Garonne (FR); Christophe Basso, Pibrac (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 11/572,456

(22) PCT Filed: Mar. 2, 2006

(86) PCT No.: PCT/US2006/007457
§ 371 (c)(1),
(2), (4) Date: Jan. 22, 2007

(87) PCT Pub. No.: WO2007/100328
PCT Pub. Date: Sep. 7, 2007

(65) Prior Publication Data
US 2009/0015225 A1    Jan. 15, 2009

(51) Int. Cl.
*G05F 1/00* (2006.01)
(52) U.S. Cl. ............... 323/283; 323/282; 323/288
(58) Field of Classification Search ........... 323/224, 323/228, 238, 241, 266, 271, 282, 283
See application file for complete search history.

(56) References Cited

U.S. PATENT DOCUMENTS

| 6,552,517 | B1* | 4/2003 | Ribellino et al. | 323/282 |
| 6,828,766 | B2* | 12/2004 | Corva et al. | 323/284 |
| 7,045,993 | B1* | 5/2006 | Tomiyoshi | 323/224 |
| 7,239,120 | B2* | 7/2007 | Adragna et al. | 323/285 |
| 2002/0135341 | A1* | 9/2002 | Eagar | 323/282 |
| 2008/0036440 | A1* | 2/2008 | Garmer | 323/299 |

* cited by examiner

*Primary Examiner* — Adolf Berhane
*Assistant Examiner* — Nguyen Tran
(74) *Attorney, Agent, or Firm* — Rennie William Dover

(57) ABSTRACT

A voltage regulator (10) having an undervoltage protection circuit 11 and a method for protecting against an output voltage out being less than a predetermined level. The voltage regulator has an undershoot limitation circuit (11) coupled between a feedback network (30) and a regulation section (42). A power factor correction circuit (46) is connected to the regulation section. An output voltage out from the power factor correction circuit (46) is fed back to the feedback network (30), which transmits a portion of the output voltage to the undershoot limitation circuit (11). If the output voltage is greater than the predetermined voltage level, a switching circuit portion (34) of the undershoot limitation circuit (11) transmits a normal control signal to the regulation circuit (42). If the output voltage is less than the predetermined voltage level, the switching circuit portion transmits an enhanced control signal to the regulation circuit. The enhanced control signal quickly brings the output voltage up to at least the minimum desired level.

30 Claims, 3 Drawing Sheets

METHOD FOR REGULATING A VOLTAGE AND CIRCUIT THEREFOR

FIELD OF THE INVENTION

This invention relates, in general, to power supplies and, more particularly, to power factor correction systems.

BACKGROUND OF THE INVENTION

Power Factor Correction ("PFC") systems are typically used within power supply applications requiring AC/DC rectification. Rectifying arrangements for use in such an application may comprise a full wave voltage rectifier, typically in the form of a diode bridge, and a main Switch Mode Power Supply ("SMPS") to provide regulation of the output waveform. PFC circuits are inserted between the line and the main SMPS to draw a sinusoidal current from the line and to provide Direct Current ("DC") voltage to the main SMPS. For many systems to operate properly, it is desirable for the output voltage of the PFC circuit to be within a specified range. PFC circuits deliver a squared sinusoidal power that matches an average power demand of the load. Thus, when the power fed to the load is lower than the demand, the output capacitor compensates for the lack of energy by discharging and when the power fed to the load is greater than the demand, the capacitor stores the excess energy. As a consequence, a ripple appears in the output voltage that designers compensate for by integrating the output voltage. A drawback with the integration is that it degrades the dynamic performance of the PFC systems and makes them slow. For example, an abrupt decrease in the load results in high output voltage overshoot and an abrupt increase in the load results in a high output voltage undershoot.

Hence, there exists a need for a PFC system and a method of improving the dynamic performance and speed of the PFC system. In addition, it is desirable for the PFC system to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements, and in which.

DETAILED DESCRIPTION

Generally, the present invention provides a circuit and a method for limiting undervoltages and overvoltages in a regulated output signal. In particular, the circuit and method limit undershoot in the regulated output signal. In accordance with one embodiment, the present invention detects undershoot in an output signal such as, for example, a voltage signal, and transmits a boosted control signal to a regulation section of a regulator circuit. As those skilled in the art are aware, it is desirable for a voltage regulator to output a predetermined or nominal output voltage and for the output voltage to remain substantially constant independent of the load coupled to the regulator. The boosted control signal quickly adjusts the regulated output voltage to compensate for the undershoot. An advantage of a regulator of the present invention is that the original control signal is not modified. Rather, it is prevented from being transmitted to the regulation section. Another advantage is that the undershoot limitation circuit uses a transconductance amplifier to sample a feedback signal. The transconductance amplifier monitors the voltage of the feedback circuit without modifying it. Thus, it allows for a more accurate sampling of the feedback circuit.

Figure 1:
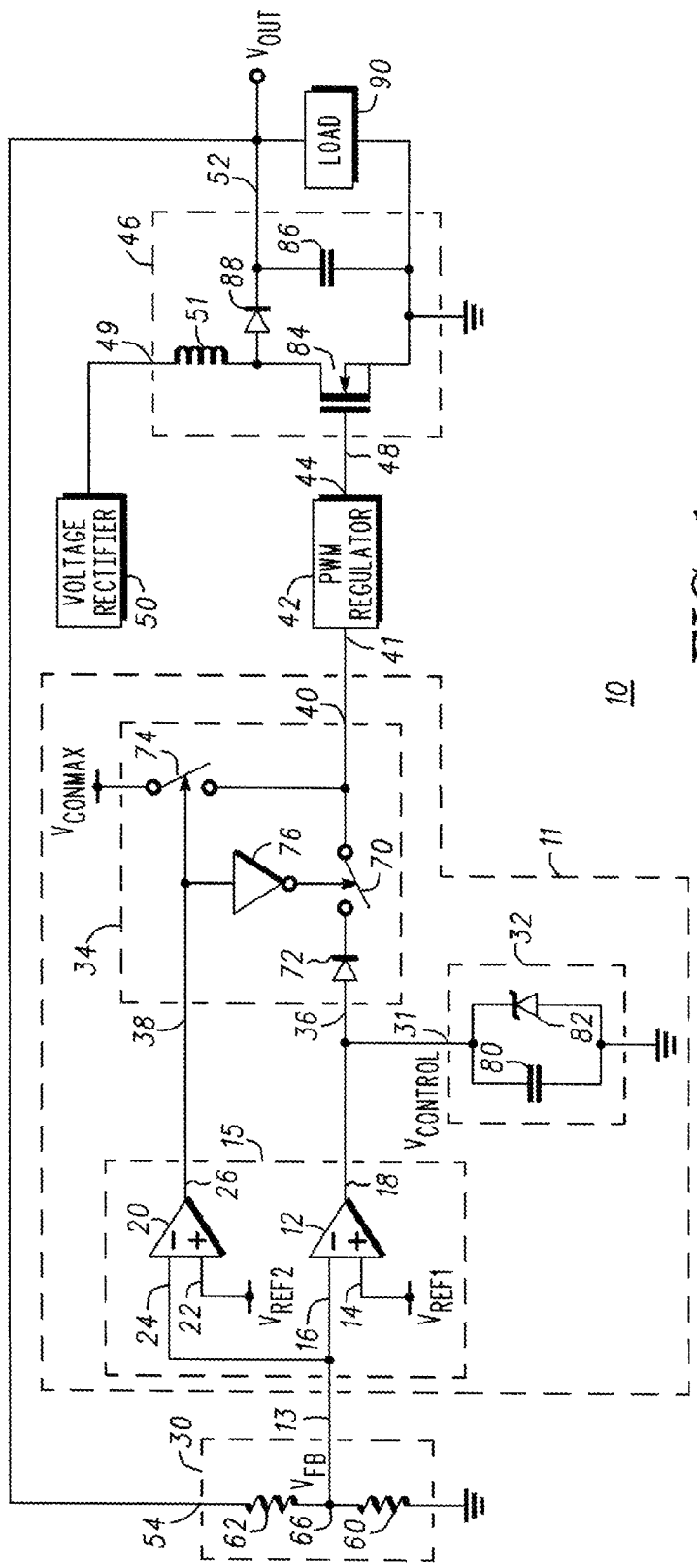
FIG. 1 is schematic diagram of a voltage regulator having an undershoot limitation circuit in accordance with an embodiment of the present invention.

FIG. 1 is a schematic diagram of a voltage regulator 10 comprising an undershoot limitation circuit 11 having an input 13 and an output 40, which output is connected to an input 41 of a switching or Pulse Width Modulated ("PWM") regulator 42. An output 44 of PWM regulator 42 is connected to an input 48 of a Power Factor Correction ("PFC") circuit 46. An input 49 of PFC circuit 46 is connected to a rectifier 50 and an output 52 of PFC circuit 46 is connected to an input 54 of feedback network 30.

Feedback network 30 may be comprised of a pair of resistors 60 and 62 in which one terminal of resistor 60 is coupled for receiving a source of operating potential such as, for example, ground, and one terminal of resistor 62 serves as input 54 of feedback network 30. The other terminals of resistors 60 and 62 are connected together to form a node 66, which node 66 is connected to commonly connected inputs 16 and 24 of transconductance amplifier 12 and comparator 20, respectively. It should be understood that feedback network 30 is not limited to being a resistor divider network. Although feedback network 30 may be integrated in a semiconductor substrate along with undershoot limitation network 11 and PWM regulator 42, it is preferably provided as an off-chip circuit network.

In accordance with one embodiment, undershoot limitation circuit 11 includes an input section 15, which comprises a transconductance amplifier 12 and a comparator 20. Transconductance amplifier 12 has inputs 14 and 16 and an output 18, and comparator 20 has inputs 22 and 24 and an output 26. Inputs 16 and 24 of are connected to each other and inputs 14 and 22 are coupled for receiving reference voltages $V_{REF1}$ and $V_{REF2}$, respectively. Commonly connected inputs 16 and 24 are connected to feedback network 30. Output 18 of transconductance amplifier 12 is connected to an output 31 of a compensation network 32 and to an input 36 of a switching section or circuit 34, which comprises switches 70 and 74, a diode 72, and an inverter 76. Output 26 of comparator 20 is connected to an input 38 of switching section 34. Switch 70 has a terminal coupled to input 36 through diode 72 and a terminal connected to output 40 and to one terminal of switch 74. The terminal of switch 70 that is coupled to input 36 is also coupled to output 31 of compensation network 32 through diode 72. Input 38 is operatively coupled for controlling switch 74 and for controlling switch 70 through an inverter 76.

By way of example, compensation network 32 comprises a capacitor 80 coupled in a parallel configuration with a Zener diode 82.

PFC circuit 46 comprises an Insulated Gate Field Effect Transistor ("IGFET") 84 having a gate that serves as input 48, a drain coupled to rectifier 50 through an inductor or coil 51, and a source coupled for receiving a source of operating potential such as, for example, ground. The drain of IGFET 84 is connected to one terminal of an inductor 51 and the other terminal of inductor 51 serves as input 49 of PFC circuit 46, which input is connected to voltage rectifier 50. PFC circuit 46 also includes a capacitor 86 having one terminal coupled to the cathode of diode 88 and a terminal coupled for receiving a source of operating potential such as, for example, ground. Thus, capacitor 86 is coupled to the drain of IGFET 84 through diode 88. The terminal of capacitor 86 connected to diode 88 and the cathode of diode 88 form an output or output node 52.

A load 90 is coupled in parallel with capacitor 86.

In operation, rectifier 50 provides a rectified voltage signal to input 49 of PFC circuit 46, which boosts the rectified voltage signal and generates an output voltage $V_{OUT}$ at output 52. Output voltage $V_{OUT}$ is fed back to feedback network 30 which generates a feedback signal $V_{FB}$ at node 66. Transconductance amplifier 12 amplifies the difference between feedback signal $V_{FB}$ and reference voltage $V_{REF1}$ and generates an output current at output 18 that charges capacitor 80 of compensation network 32 if feedback voltage $V_{FB}$ is less than reference voltage $V_{REF1}$ or discharges capacitor 80 if feedback voltage $V_{FB}$ is greater than reference voltage $V_{REF1}$. The output current is a control signal. The voltage across capacitor 80 is a control voltage for controlling the power that is delivered to load 90 and is referred to as control voltage or control signal $V_{CONTROL}$. The maximum voltage level that can appear across capacitor 80 is preferably limited by Zener diode 82, when it is active.

Comparator 20 compares feedback voltage $V_{FB}$ with reference voltage $V_{REF2}$ and generates a control signal at output 26 that is a logic low voltage level when feedback voltage $V_{FB}$ is greater than reference voltage $V_{REF2}$. The logic low voltage level at output 26 occurs when output voltage $V_{OUT}$ is either in a nominal voltage condition or in an over-voltage condition. The logic low voltage level is transmitted to input 38 of switching circuit 34 causing switch 70 to close and switch 74 to open. This switch configuration applies or injects control voltage $V_{CONTROL}$ into PWM regulator 42, which regulator 42 modulates or regulates the power delivered to load 90. By way of example, switches 70 and 74 are switching transistors. It should be noted that when a switching transistor is used as the switch, the switch is closed when the transistor is on and the switch is open when the transistor is off. As those skilled in the art are aware, a logic high voltage level control signal is also referred to as a true control signal and a logic low voltage level control signal is also referred to as a complementary control signal.

Comparator 20 generates a logic low voltage level at output 26 when feedback voltage $V_{FB}$ is greater than reference voltage $V_{REF2}$. Thus, control voltage $V_{CONTROL}$ is applied to or injected into PWM regulator 42, which regulator 42 modulates or regulates the power delivered to load 90.

In response to output voltage $V_{OUT}$ being an undervoltage or having an undershoot, feedback voltage $V_{FB}$ is less than reference voltage $V_{REF2}$. Comparator 20 compares voltage $V_{FB}$ with voltage $V_{REF2}$ and generates a logic high voltage level that appears at output 26. The logic high voltage level is transferred to input 38 of switching circuit 34 causing switch 70 to open and switch 74 to close. In addition, if the voltage appearing at output 18 becomes sufficiently high, Zener diode 82 becomes activated and clamps output 18 at a voltage $V_{CONMAX}$. Because this switch configuration opens switch 70 and closes switch 74, it opens or breaks an electrical path between input 36 and output 40, thereby preventing control voltage $V_{CONTROL}$ from appearing at input 41 of PWM regulator 42. This switch configuration also couples a control voltage or a control signal $V_{CONMAX}$ to input 41 of PWM regulator 42. Control voltage $V_{CONMAX}$ is at a higher voltage level than control voltage $V_{CONTROL}$ so that it can force PWM regulator 42 and PFC circuit 46 to quickly increase output voltage $V_{OUT}$. In accordance with one embodiment, $V_{CONMAX}$ is the voltage across Zener diode 82 when it is at its Zener or breakdown voltage.

Figure 2:
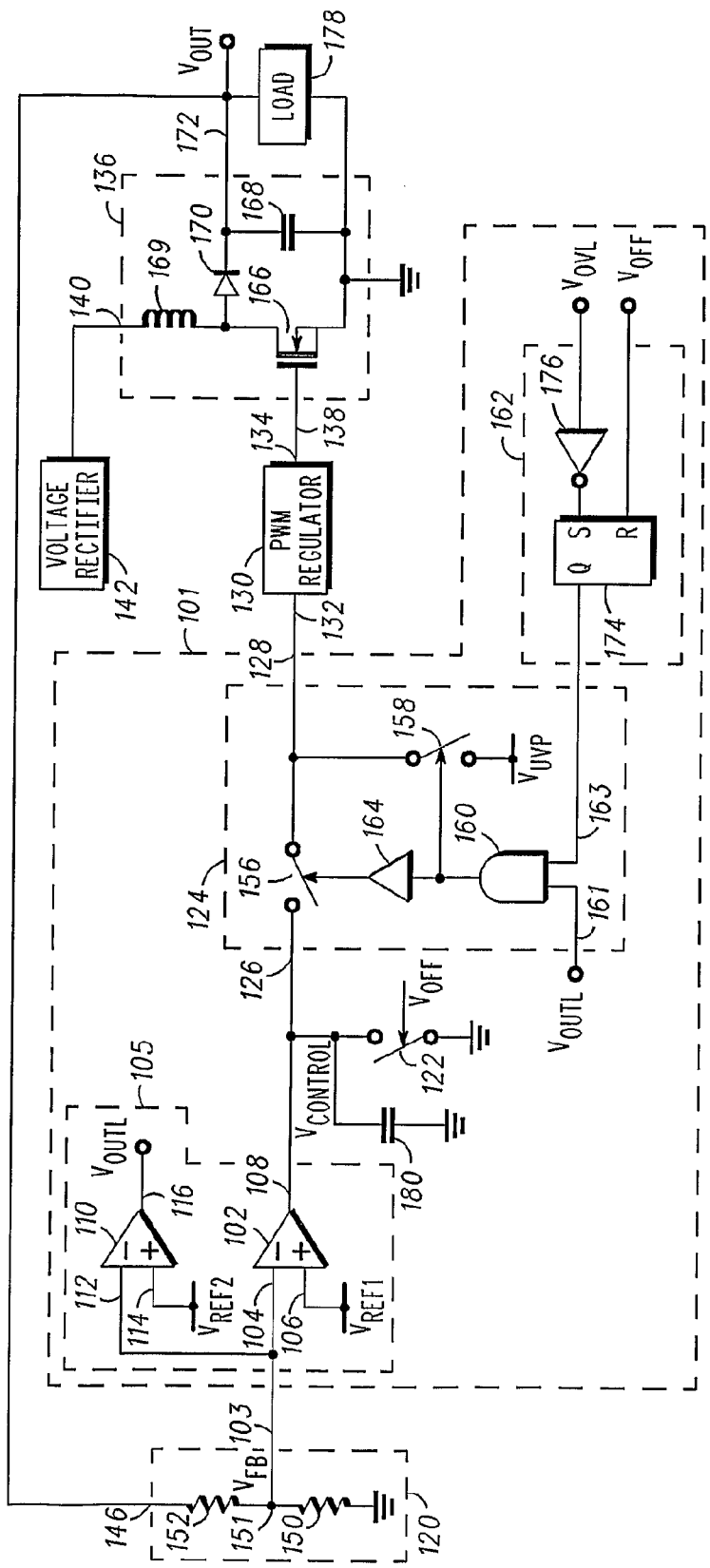
FIG. 2 is a schematic diagram of a voltage regulator having an undershoot limitation circuit and a start-up protection circuit in accordance with another embodiment of the present invention.

Referring now to FIG. 2, a schematic diagram of a voltage regulator 100 in accordance with another embodiment of the present invention is shown. Voltage regulator 100 comprises an undershoot limitation circuit 101 having an input 103 and an output 128, which is connected to an input 132 of a switching or Pulse Width Modulated ("PWM") regulator 130. An output 134 of PWM regulator 130 is connected to an input 138 of a Power Factor Correction ("PFC") circuit 136. An input 140 of PFC circuit 136 is connected to a rectifier 142 and an output 172 of PFC circuit 136 is connected to an input 146 of feedback network 120. Output 172 serves as the output of voltage regulator 100.

In accordance with one embodiment, feedback network 120 comprises a pair of resistors 150 and 152 connected such that one terminal of resistor 150 is coupled for receiving a source of operating potential such as, for example, ground and one terminal of resistor 152 serves as input 146 of feedback network 120. The other terminals of resistors 150 and 152 are commonly connected together to form a node 151, which node 151 is connected to input 104 of transconductance amplifier 102. Although feedback network 120 may be integrated in a semiconductor substrate along with undershoot limitation circuit 101, PWM regulator 130, and start-up circuit 162, it is preferably provided as an off-chip circuit network.

In accordance with one embodiment, undershoot limitation circuit 101 includes an input section 105 comprising a transconductance amplifier 102 having inputs 104 and 106 and an output 108, and a comparator 110 having inputs 112 and 114 and an output 116. Inputs 104 and 112 of transconductance amplifier 102 and comparator 110, respectively, are connected to each other and inputs 106 and 114 are coupled for receiving reference voltages $V_{REF1}$ and $V_{REF2}$, respectively. Reference voltage $V_{REF2}$ is less than reference voltage $V_{REF1}$. By way of example, reference voltage $V_{REF2}$ is approximately ninety-five percent of reference voltage $V_{REF1}$. Inputs 104 and 112 are connected to a feedback network 120. Transconductance amplifier 102 and comparator 110 are coupled to switching circuit 124. More particularly, output 108 of transconductance amplifier 102 is connected to a switch 122 and output 116 is connected to AND gate 160. It should be noted that the connection between output 116 and AND gate 160 is not shown for the sake of clarity. Rather, signal labels are used to denote the connection. Switch 122 has a terminal connected to output 108, a terminal connected for receiving an operating potential such as, for example, ground, and a control terminal operatively coupled for receiving a control voltage or control signal $V_{OFF}$. Output 116 of comparator 110 is coupled for transmitting a control voltage or control signal $V_{OUTL}$ to other parts of voltage regulator 100 such as, for example, switching circuit 124. Output 108 of transconductance amplifier 102 is connected to an input 126 of switching circuit 124. In addition, a capacitor 180 is coupled between output 108 and source of operating potential such as, for example, ground.

Switching circuit 124 comprises switches 156 and 158, wherein switch 156 has a terminal that serves as input 126 and a terminal connected to one terminal of switch 158. The commonly connected terminals of switches 156 and 158 serve as output 128 of switching circuit 124. The other terminal of switch 158 is coupled for receiving a reference voltage $V_{UVP}$. Switching circuit 124 further includes a logic gate 160 having an input 161 coupled for receiving output signal $V_{OUTL}$ from comparator 110 and an input 163 coupled for receiving a start-up indicator signal from a start-up indicator circuit 162. By way of example, logic gate 160 is an AND gate having inputs 161 and 163. The output of AND gate 160 is operatively coupled to switch 156 through an inverter 164 for controlling the state of switch 156. In addition, the output of logic gate 160 is operatively coupled to switch 158 for controlling the state of switch 158, i.e., controlling whether switches 156 and 158 are open or closed.

PFC circuit 136 comprises an Insulated Gate Field Effect Transistor ("IGFET") 166 having a gate that serves as input 138, a drain coupled to rectifier 142 through an inductor or coil 169, and a source coupled for receiving a source of operating potential such as, for example, ground. The drain of IGFET 166 is also coupled to a capacitor 168 through a diode 170. More particularly, one terminal of capacitor 168 is connected to the cathode of diode 170 and the other terminal of capacitor 168 is coupled for receiving a source of operating potential such as, for example, ground. The commonly connected terminals of capacitor 168 and diode 170 form output 172 of voltage regulator 10, i.e., the cathode of diode 170 and the terminal of capacitor 168 that is not coupled for receiving the source of operating potential.

Start-up indicator circuit 162 comprises a latch 174 having an input S coupled for receiving control signal $V_{OVL}$ through an inverter 176, a reset input R coupled for receiving control signal $V_{OFF}$, and an output Q coupled to input 163 of two-input AND gate 160.

A load 178 is coupled in parallel with capacitor 168.

It is desirable for voltage regulator 100 to start operation in a manner that limits stress and audible noise during start up such as plugging in an appliance. In systems with a low regulation bandwidth, a capacitor such as capacitor 180 can be included to not only control the regulation bandwidth but also maintain smooth start-up characteristics. A control signal $V_{OFF}$ is used to control the operational state of voltage regulator 100. When control signal $V_{OFF}$ is at a logic high voltage level, voltage regulator 100 closes switch 122 and resets latch 174. Resetting latch 174 places a logic low voltage level at input 162 of AND gate 160 so that a logic low voltage level appears at its output. Control signal $V_{OFF}$ can be generated when a power supply signal such as $V_{CC}$ is too low, or if regulator 100 enters a shutdown mode, or if regulator 100 enters a hibernate, mode, or the like. The logic low voltage level at the output of AND gate 160 causes switch 156 to close and switch 158 to open. Thus, the voltage appearing at input 126 of switching circuit 124 is applied to or injected into PWM regulator 130, which regulator 130 modulates or regulates the power delivered to load 178. Closing switch 122 discharges capacitor 180.

When voltage regulator 100 begins operation, a very small amount of energy, if any, is transferred from PFC circuit 136 to feedback network 120. The size of capacitor 180 is selected so that it is slowly charged to promote a soft-start, i.e., it charges at a rate of less than approximately 100 volts per second. It should be understood that during start-up, voltage regulator 100 may be operating in an undershoot mode. This operating mode will be further described after describing the operation of undershoot limitation circuit 101.

Rectifier 142 provides a rectified voltage signal to input 140 of PFC circuit 136, which boosts the rectified voltage and generates an output voltage $V_{OUT}$ at output 172. Output voltage $V_{OUT}$ is fed back to feedback network 120 which generates a feedback signal $V_{FB}$ at node 151. Transconductance amplifier 102 amplifies the difference between feedback signal $V_{FB}$ and reference voltage $V_{REF1}$ and generates an output current at output 108 that charges capacitor 180 if feedback voltage $V_{FB}$ is less than reference voltage $V_{REF1}$ or discharges capacitor 180 if feedback voltage $V_{FB}$ is greater than reference voltage $V_{REF1}$. The voltage across capacitor 180 is a control signal or voltage for controlling the power that is delivered to load 178 and is referred to as control voltage $V_{CONTROL}$.

Comparator 110 compares feedback voltage $V_{FB}$ with reference voltage $V_{REF2}$ and generates an output voltage $V_{OUTL}$ at output 116. Output voltage $V_{OUTL}$ is at a logic low voltage level when feedback voltage $V_{FB}$ is greater than reference voltage $V_{REF2}$. The logic low voltage level at output 116 occurs when output voltage $V_{OUT}$ is in either a nominal voltage condition or in an overvoltage condition. The logic low voltage level is transmitted to an input of switching circuit 124, which input is input 161 of two-input AND gate 160. Because $V_{OUTL}$ is at a logic low voltage level, the output voltage of AND gate 160 is also at a logic low voltage level, which causes switch 156 to close and switch 158 to open. This switch configuration causes control voltage $V_{CONTROL}$ to be applied to or injected into PWM regulator 130, which regulator 130 modulates or regulates the power delivered to load 178.

In response to output voltage $V_{OUT}$ being less than a predetermined or nominal output level, i.e., voltage $V_{OUT}$ being in an undershoot condition, feedback voltage $V_{FB}$ is also less than reference voltage $V_{REF2}$. Comparator 110 compares voltage $V_{FB}$ with voltage $V_{REF2}$ and generates a logic high voltage level that appears at output 116. The logic high voltage level is transmitted to input 161 of switching circuit 124, i.e., input 161 of two-input AND gate 160. Because voltage $V_{OUTL}$ is at a logic high voltage level, the voltage level at the output of AND gate 160 is controlled by start-up indicator circuit 162, i.e., the voltage at output Q of latch 174. Due to the undershoot voltage condition, voltage $V_{OVL}$ at the input of start-up indicator circuit 162 is at a logic low voltage level. The logic low voltage level is converted to a logic high voltage level by inverter 176 and transmitted to input 163. A logic high voltage level appears at the output of AND gate 160, resulting in switch 158 being closed and switch 156 being open. In this switch configuration, the voltage at output 108 of transconductance amplifier 102 is decoupled from output 128 and control voltage $V_{UVP}$ is coupled to output 128. Control voltage $V_{UVP}$ is at a higher voltage level than control voltage $V_{CONTROL}$ so that it can force PWM regulator 130 and PFC circuit 136 to quickly increase output voltage $V_{OUT}$.

Start-up indicator circuit 162 is included to allow voltage regulator 100 to bypass switching circuit 124 during start up at which time transconductance amplifier 102 charges capacitor 180. In addition, a control voltage $V_{OVL}$ is set to a logic high voltage level. The logic high voltage level is transmitted to start-up indicator circuit 162 which inputs a logic low voltage level to input 163 of AND gate 160, which logic low voltage level appears at the output of AND gate 160, causing switch 156 to close and switch 158 to open. When capacitor 180 stops charging, control voltage $V_{OVL}$ is set to a logic low voltage level indicating detection of the end of the start-up phase. The logic low voltage level is transmitted to start-up indicator circuit 162 which inputs a logic high voltage level to input 163 of AND gate 160. Placing a logic high voltage level on one of the inputs of AND gate 160 allows the voltage at the other input of AND gate 160 to control the output voltage level of AND gate 160. Thus, the voltage on input 163 of AND gate 160 controls whether control signal $V_{CONTROL}$ or control signal $V_{UVP}$ is transmitted to PWM regulator 130. It should be noted that control signal $V_{OFF}$ discharges capacitor 180 by coupling it to ground when regulator 100 is off.

Figure 3:
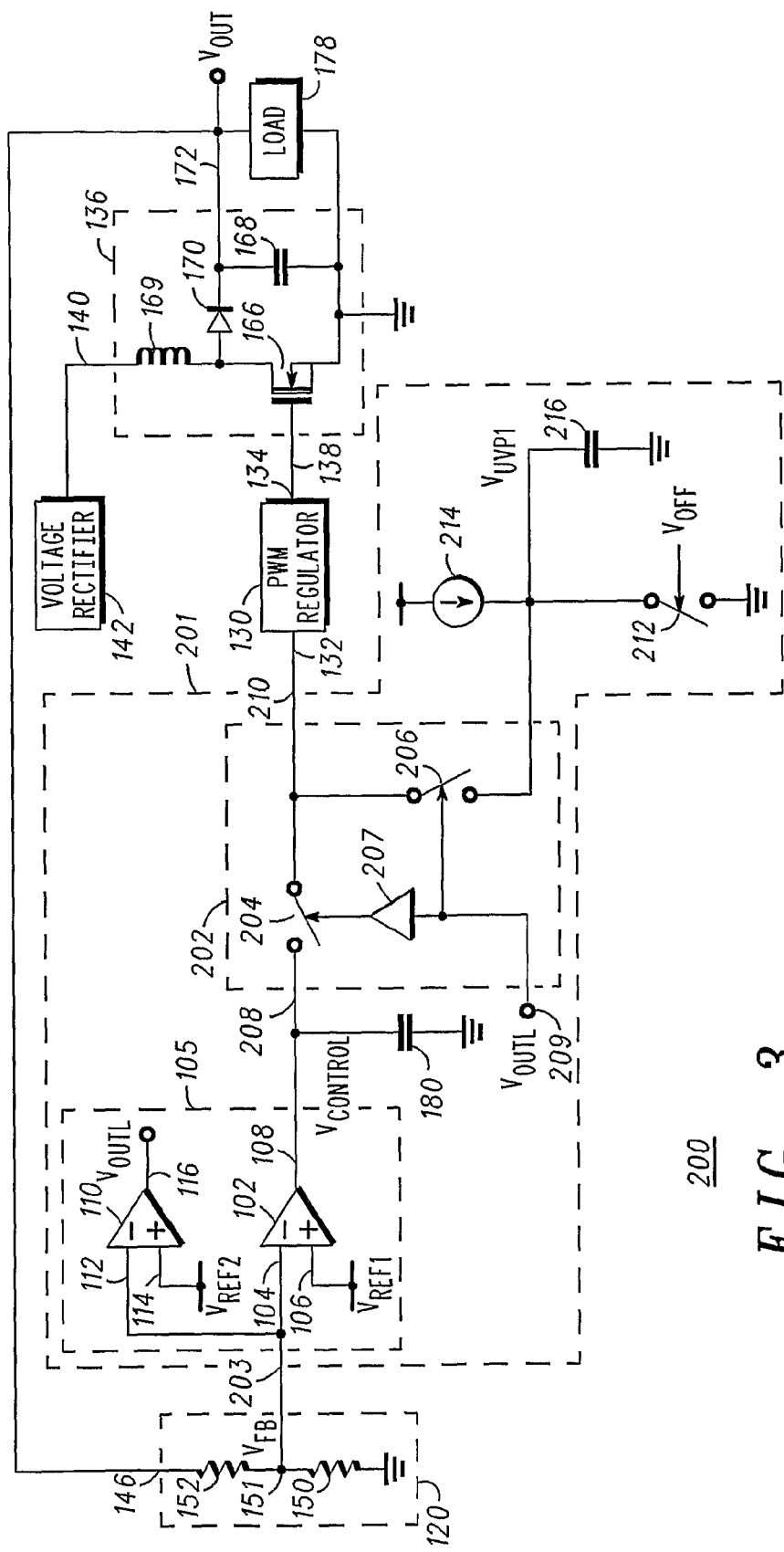
FIG. 3 is a schematic diagram of a voltage regulator having an undershoot limitation circuit and a start-up protection circuit in accordance with yet another embodiment of the present invention.

Referring now to FIG. 3, a schematic diagram of a voltage regulator 200 in accordance with another embodiment of the present invention is shown. Voltage regulator 200 comprises an undershoot limitation circuit 201 having an input 203 and an output 210. Like voltage regulator 100, voltage regulator 200 includes an input section 105, feedback network 120, PWM regulator 130, and PFC circuit 136. Rather than having switching circuit 124, voltage regulator 200 has a switching section 202. In accordance with one embodiment, switching section 202 comprises switches 204 and 206 and an inverter 207. One terminal of switch 204 serves as an input 208 and the other terminal of switch 204 is connected to a terminal of switch 206. The commonly connected terminals of switches 204 and 206 serve as output 210 of undershoot limitation circuit 201. The other terminal of switch 206 is coupled to a terminal of a switch 212, as well as to a terminal of a current source 214, and to a terminal of a capacitor 216. The other terminals of switch 212 and capacitor 216 are coupled for receiving a source of operating potential such as, for example, ground. A control voltage $V_{OUTL}$ is operatively coupled to switch 204 through inverter 207 and to switch 206, i.e., it serves as a control signal for switches 204 and 206. Setting control voltage $V_{OUTL}$ to a logic high voltage level opens switch 204 and closes switch 206 and setting control voltage $V_{OUTL}$ to a logic low voltage level closes switch 204 and opens switch 206.

Unlike, voltage regulator 100, switch 122 is absent from voltage regulator 200.

In operation, rectifier 142 provides a rectified voltage signal to input 140 of PFC circuit 136, which boosts the rectified voltage and generates an output voltage $V_{OUT}$ at output 172. Output voltage $V_{OUT}$ is fed back to feedback network 120 which generates a feedback signal $V_{FB}$ at node 151. Transconductance amplifier 102 amplifies the difference between feedback signal $V_{FB}$ and reference voltage $V_{REF1}$ and generates an output current at output 108 that charges capacitor 180 if feedback voltage $V_{FB}$ is less than reference voltage $V_{REF1}$ or discharges capacitor 180 if feedback voltage $V_{FB}$ is greater than reference voltage $V_{REF1}$. The voltage across capacitor 180 is a control signal or voltage for controlling the power that is delivered to load 178 and is referred to as control voltage $V_{CONTROL}$.

Comparator 110 compares feedback voltage $V_{FB}$ with reference voltage $V_{REF2}$ and generates an output voltage $V_{OUTL}$ at output 116. Output voltage $V_{OUTL}$ is at a logic low voltage level when feedback voltage $V_{FB}$ is greater than reference voltage $V_{REF2}$. The logic low voltage level at output 116 occurs when output voltage $V_{OUT}$ is in either a nominal voltage condition or in an overload condition. The logic low voltage level is transmitted to control input 209 of switching section 202, which controls the states of switches 204 and 206. Voltage $V_{OUTL}$ being at a logic low voltage level causes switch 204 to be closed and switch 206 to be open. This switch configuration causes control voltage $V_{CONTROL}$ to be applied to or injected into PWM regulator 132, which regulator 132 modulates or regulates the power delivered to load 178.

In response to output voltage $V_{OUT}$ being lower than the nominal value, i.e., $V_{OUT}$ being in an undershoot condition, feedback voltage $V_{FB}$ is less than reference voltage $V_{REF2}$. Comparator 110 compares voltage $V_{FB}$ with voltage $V_{REF2}$ and generates a logic high voltage level that appears at output 116. The logic high voltage level is transmitted to input 209. Voltage $V_{OUTL}$ being at a logic high voltage level causes switch 204 to be open and switch 206 to be closed. In this switch configuration, the voltage at output 108 of transconductance amplifier 102 is decoupled from output 210 and control voltage $V_{UVP1}$ is coupled to output 210.

Control voltage $V_{UVP1}$ is the voltage across capacitor 216 and it is generated by current source 214 charging capacitor 216. Before start-up, control signal $V_{OFF}$ was set to a logic high voltage level, thereby closing switch 212 and discharging capacitor 216. At or near start-up, control signal $V_{OFF}$ is set to a logic low voltage level, which opens switch 212. Because the circuit is starting up, feedback signal $V_{FB}$ is less than reference voltage $V_{REF2}$, voltage $V_{OUTL}$ is at a logic high voltage level, switch 204 is open, and switch 206 is closed. In this configuration current source 214 charges capacitor 216. An advantage of this embodiment is that during start-up, and as long as $V_{FB}$ is less than $V_{REF2}$, the voltage applied to PWM regulator 130 gradually increases which allows a soft start-up. Thus, the voltage applied to PWM regulator 130 is time varying.

By now it should be appreciated that methods and circuits for protecting against undershoot in an output voltage have been provided. In accordance with embodiments of the present invention, undershoot limitation circuits are included with the voltage regulator to increase the voltage at the input of the regulation portion. An advantage of the present invention is that the undershoot limitation circuits include switching circuits or networks that route a control voltage to the regulation portion during normal operation and an enhanced control voltage to the regulation portion when the output voltage of the voltage regulator experiences an undershoot condition. The enhanced control voltage or signal can be a time varying signal or a constant signal such as, for example, a logic signal. Another advantage of the present invention is that the undershoot limitation circuits include analog circuitry, i.e., a transconductance amplifier, that does not alter the feedback signal thereby improving the accuracy of the output voltage.

Although certain preferred embodiments and methods have been disclosed herein, it will be apparent from the foregoing disclosure to those skilled in the art that variations and modifications of such embodiments and methods may be made without departing from the spirit and scope of the invention. For example, overshoot protection can be provided. In accordance with one embodiment related to regulator 10, the circuit can be modified to provide overshoot protection by switching the feedback signal ($V_{FB}$) to be at the non-inverting input of the comparator, applying a reference voltage $V_{REF2}$ to the inverting input, and changing the control voltage $V_{CONMAX}$ at the terminal of, for example, switch 74 to be a low voltage level. It is intended that the invention shall be limited only to the extent required by the appended claims and the rules and principles of applicable law.

What is claimed is:
1. A method for regulating a voltage, comprising:
  comparing a feedback signal with a second reference signal to generate a second control signal and amplifying a difference between the feedback signal and a first reference signal to generate a first control signal;
  in response to the feedback signal being greater than the first reference signal:
    generating the first control signal at an output of a transconductance amplifier, the first control signal having a first value; and
    using the first control signal to discharge an energy storage element;
  in response to the feedback signal being greater than the second reference signal:

generating the second control signal at an output of a comparator, the second control signal having a first signal level; and using the second control signal at the first signal level to couple a third control signal to a pulse width modulation circuit, the third control signal having a substantially constant voltage;

in response to the feedback signal being less than the first reference signal:

generating the first control signal at the output of the transconductance amplifier to have a second value; and using the first control signal at the second value to charge the energy storage element;

in response to the feedback signal being less than the second reference signal:

generating the second control signal at the output of the comparator, the second control signal at a second signal level; and using the second control signal at the second signal level to decouple the third control signal from the input of the pulse width modulation circuit.

2. The method of claim 1, wherein charging and discharging the energy storage element comprises charging and discharging a capacitor.

3. The method of claim 2, wherein the feedback signal is a voltage signal.

4. The method of claim. 3, wherein the feedback signal is less than the second reference voltage in response to an output voltage being in an undervoltage condition.

5. The method of claim 1, wherein generating the first control signal includes generating a current signal.

6. The method of claim 1, wherein generating the second control signal includes generating a voltage signal.

7. The method of claim 5, wherein the first and second signal levels of the second control signal are one of a logic high signal or a logic low signal.

8. A method for regulating a voltage, comprising:

comparing a feedback voltage to a second reference voltage to generate a first control signal at an output of a comparator in response to the feedback signal being greater than the second reference voltage, the first control signal at a first signal level;

amplifying a difference between the feedback voltage and a first reference voltage to generate a second control signal at an output of a transconductance amplifier in response to the feedback voltage being greater than the second reference voltage, the second control signal at a first value;

generating the first control signal at the output of the comparator to have a second signal level in response to the feedback signal being less than the second reference voltage;

coupling a third control signal to a pulse width modulation regulator in response to the first control signal being at the first signal level and decoupling the third control signal from the pulse width modulation circuit in response to the first control signal being at the second signal level, the third control signal being a DC signal;

using the second control signal at the first value to discharge an energy storage element;

generating the second control signal at the output of the transconductance amplifier in response to the feedback voltage being less than the second reference voltage; and using the second control signal at the second value to charge the energy storage element.

9. The method of claim 8, further including clamping the second control signal at a predetermined level.

10. The method of claim 9, wherein the first and second signal levels are complementary signal levels.

11. The method of claim 10, wherein coupling a third control signal to the pulse width modulation regulator includes closing a first switch.

12. The method of claim 11, further including coupling the second control signal to the pulse width modulation regulator by closing a second switch in response to the first control signal.

13. A voltage regulator, comprising:

an undershoot limitation circuit, comprising:

a transconductance amplifier having first and second inputs and an output, the first input coupled for receiving a feedback voltage and the second input coupled for receiving a first reference voltage;

a comparator having first and second inputs and an output for transmitting a first control signal, the first input coupled for receiving the feedback voltage and the second input coupled for receiving a, second reference voltage, the first reference voltage greater than the second reference voltage; and a switching circuit having first, second, and third inputs and an output, the first input coupled to the:output of the transconductance amplifier, the second input coupled to the output of the comparator, the output of the switching circuit coupled for transmitting a second control voltage, and the third input coupled for receiving a third control voltage that is a DC voltage; and a regulation circuit having an input and an output, the input coupled to the output of the undershoot limitation circuit.

14. The voltage regulator of claim 13, wherein the switching circuit comprises:

a first switch having first and second terminals, the first terminal coupled to the output of the transconductance amplifier; and a second switch having first and second terminals, the first terminal coupled to the second current carrying conductor of the first switch and the second terminal serving as the third input and coupled for receiving the third control voltage.

15. The voltage regulator of claim 14, further including a diode coupled between the first terminal of the first switch and the output of the transconductance amplifier.

16. The voltage regulator of claim 14, further including an inverter coupled between the output of the comparator and a control terminal of the first switch.

17. A method for regulating a voltage, comprising:

providing first and second reference signals;

comparing a feedback signal with the first reference signal;

generating a first control voltage in response to the comparison between the feedback signal and the first reference signal;

generating a second control voltage in response to the feedback signal being different from the second reference signal; and using the first control voltage to control the operating state of an undershoot limitation circuit by opening a first switch and closing a second switch to transmit the second control voltage to a circuit in response to the first control voltage being at a first logic state and closing the first switch and opening the second switch to transmit a third control voltage to the circuit in response to the first control voltage being at a second logic state, wherein the third control voltage is a substantially constant voltage.

18. A method for regulating a voltage, comprising:
providing first and second reference signals;
comparing a feedback signal with the first reference signal;
generating a first control signal in response to the comparison between the feedback signal and the first reference signal;
generating a second control signal in response to the feedback signal being different from the second reference signal; and
using the first control signal to control the operating state of an undershoot limitation circuit by operatively coupling the first control signal to a first switch and operatively coupling a complementary first control signal to a second switch, wherein the first control signal at a first logic state opens the first switch and the complementary first control signal at a second logic state closes the second switch to transmit the second control signal to a circuit and wherein the first control signal at the second logic state closes the first switch and the complementary first control signal at the first logic state opens the second switch to transmit a third control signal to the circuit, wherein the third control signal is a substantially constant voltage.

19. The method of claim 18, further including using the first control signal to close the first switch.

20. The method of claim 18, further including:
charging a charge storage device; and
transmitting a voltage of the charge storage device through the first switch to a circuit.

21. The method of claim 1, further including coupling a clamping element across the energy storage element.

22. The method of claim 21, wherein coupling the clamping element across the energy storage element comprises coupling a Zener diode across the energy storage element.

23. The method of claim 1, wherein using the second control signal to couple the third control signal to the pulse width modulation circuit includes using the second control signal to close a first switch and to open a second switch.

24. The method of claim 23, wherein using the fourth control signal to decouple the third control signal from the pulse width modulation circuit includes using the fourth control signal to open a first switch and to close the second switch.

25. The method of claim 1, further including using the second control signal to decouple the first control signal from the pulse width modulation circuit and using the fourth control signal to couple the first control signal to the pulse width modulation circuit.

26. The method of claim 8, wherein generating the fourth control signal includes charging a capacitor with a current or discharging the capacitor with another current.

27. The voltage regulator of claim 13, further including a capacitor having first and second terminals, the first terminal coupled to the output of the transconductance amplifier and the second terminal coupled for receiving a source of operating potential.

28. The voltage regulator of claim 27, further including a Zener diode having an anode and a cathode, the cathode coupled to the first terminal of the capacitor and the anode coupled to the second terminal of the capacitor.

29. The method of claim 17, wherein generating, the second control voltage includes charging a capacitor with a current.

30. The method of claim 28, wherein generating the second control signal includes using a transconductance amplifier to compare the feedback signal to the second reference signal and to generate the current.

* * * * *